(12) United States Patent
Munson

(10) Patent No.: US 8,657,573 B2
(45) Date of Patent: Feb. 25, 2014

(54) CIRCUMFERENTIAL SEALING ARRANGEMENT

(75) Inventor: John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 761 days.

(21) Appl. No.: 12/758,842

(22) Filed: Apr. 13, 2010

(65) Prior Publication Data

US 2011/0250056 A1 Oct. 13, 2011

(51) Int. Cl.
*F01D 11/02* (2006.01)

(52) U.S. Cl.
USPC ........ 415/230; 277/416; 415/113; 415/171.1; 415/231

(58) Field of Classification Search
USPC .......... 277/347, 411, 412, 416; 415/111, 113, 415/170.1, 171.1, 174.2, 229, 230, 231
See application file for complete search history.

(56) References Cited

U.S. PATENT DOCUMENTS

| | | | |
|---|---|---|---|
| 2,937,039 | A | 5/1960 | Santapa |
| 3,285,614 | A | 11/1966 | McClenathan |
| 3,468,527 | A | 9/1969 | Mather |
| 3,502,343 | A | 3/1970 | Pustelnik |
| 3,652,183 | A | 3/1972 | Pottharst, Jr. |
| 3,770,181 | A | 11/1973 | Stahl |
| 3,797,899 | A | 3/1974 | Anderson |
| 3,822,066 | A | 7/1974 | Keys |
| 3,895,811 | A | 7/1975 | Richard, Jr. |
| 3,907,308 | A | 9/1975 | Stock |
| 3,926,443 | A | 12/1975 | Fenerty |
| 4,036,505 | A | 7/1977 | Floyd |
| 4,133,541 | A * | 1/1979 | Kirk ............................... 227/65 |
| 4,174,844 | A | 11/1979 | Zobens |
| 4,196,912 | A | 4/1980 | Quitberg |

(Continued)

FOREIGN PATENT DOCUMENTS

DE 3925403 A1 1/1991
EP 0571791 A1 5/1993

OTHER PUBLICATIONS

Dunlap, Patrick H., Steinetz, Bruce M.; DeMange, Jeffrey J.; High Temperature Propulsion System Structural Seals for Future Space Launch Vehicles; 2003 NASA Seal/Secondary Air System Workshop, Nov. 5-6, 2003.

(Continued)

*Primary Examiner* — Edward Look
*Assistant Examiner* — Liam McDowell
(74) *Attorney, Agent, or Firm* — Krieg DeVault LLP

(57) ABSTRACT

A circumferential sealing arrangement is disclosed herein. The circumferential sealing arrangement includes a seal runner operable to be fixed to a structure for concurrent rotation with the structure about an axis. The circumferential sealing arrangement also includes a housing that encircles the seal runner or is encircled by the seal runner. The circumferential sealing arrangement also includes a primary seal element at least partially disposed in the housing. The primary seal element includes a first surface cooperating with a second surface of the seal runner to form a circumferential seal between the primary seal element and the seal runner. The circumferential sealing arrangement also includes a secondary seal element positioned between the housing and the primary seal element on a first side of the primary seal element along the axis of rotation. A second side of the primary seal element along the axis of rotation opposite the first side seals against the housing. The secondary seal element generates a biasing force along the axis of rotation urging the second side against the housing.

19 Claims, 4 Drawing Sheets

(56) References Cited

U.S. PATENT DOCUMENTS

| | | | |
|---|---|---|---|
| 4,212,473 A | | 7/1980 | Arai |
| 4,243,233 A | | 1/1981 | Aria |
| 4,279,424 A | | 7/1981 | Zerlauth |
| 4,323,255 A | | 4/1982 | Wiese |
| 4,336,944 A | | 6/1982 | Blair |
| 4,415,165 A | | 11/1983 | Martini |
| 4,484,752 A | | 11/1984 | Bentley |
| 4,515,377 A | | 5/1985 | Johnson |
| 4,659,092 A | | 4/1987 | Wallace |
| 4,759,554 A | | 7/1988 | Kemp |
| 4,836,559 A | | 6/1989 | Bihlmaier |
| 4,884,945 A | * | 12/1989 | Boutin et al. ............... 415/174.2 |
| 4,943,069 A | * | 7/1990 | Jinnouchi ..................... 277/543 |
| 4,973,065 A | | 11/1990 | Habich |
| 4,998,739 A | | 3/1991 | Weiler |
| 5,014,999 A | | 5/1991 | Makhobey |
| 5,017,022 A | | 5/1991 | Ruggles |
| 5,133,562 A | | 7/1992 | Lipschitz |
| 5,174,584 A | * | 12/1992 | Lahrman ....................... 277/400 |
| 5,183,270 A | | 2/1993 | Alten |
| 5,263,724 A | | 11/1993 | Hansen |
| 5,533,739 A | | 7/1996 | Sedy |
| 5,626,347 A | | 5/1997 | Ullah |
| 6,322,081 B1 | | 11/2001 | Ullah |
| 6,416,057 B1 | | 7/2002 | Adams |
| 6,446,976 B1 | * | 9/2002 | Key et al. ...................... 277/367 |
| 6,655,695 B1 | | 12/2003 | Sund |
| 6,786,488 B2 | | 9/2004 | Laurello |
| 6,918,594 B2 | | 7/2005 | Sund |
| 6,976,679 B2 | | 12/2005 | Goss |
| 6,991,235 B2 | | 1/2006 | Ebert |
| 7,093,835 B2 | | 8/2006 | Addis |
| 7,175,388 B2 | * | 2/2007 | Labbe et al. ............... 415/174.5 |
| 7,387,301 B2 | | 6/2008 | Rupp |
| 7,458,584 B2 | | 12/2008 | Addis |
| 7,461,847 B2 | | 12/2008 | Short |
| 7,591,631 B2 | | 9/2009 | Hendricks |
| 2009/0194950 A1 | * | 8/2009 | Orlowski et al. ............. 277/413 |

OTHER PUBLICATIONS

Oswald, Jay J.; Mullen, Robert; Steinetz, Bruce M.; Dunlap Jr., Patrick H.; Modeling and Evaluation of Canted Coil Springs as High Temperature Seal Preloading Devices;NASA/TM—2004-213189; Sep. 2004.

Shapiro, Wilbur; Helium Buffer Seal for the SSME, ATD Oxygen Pump; NASA Seal Workshop, 1998.

* cited by examiner

CIRCUMFERENTIAL SEALING ARRANGEMENT

BACKGROUND OF THE INVENTION

1. Field of the Invention

The invention relates to a circumferential seal with a static portion and a rotating portion and more specifically to the arrangement of the static portion.

2. Description of Related Prior Art

Circumferential seals can be used in operating environments in which one component is rotating and a second component is stationary. The circumferential seal can prevent leakage of fluid along the axis of rotation, especially where the rotating component passes through a wall or partition. The rotating component is usually called a seal runner and the non-rotating or static component can be referred to as a seal assembly or seal stator. A sealing element is usually contained within the static seal housing and contacts the seal runner to form the primary sealing interface. The seal runner can be made of metal or other materials and can be mounted to a rotating structure, such as a shaft. The seal runner can have a surface facing radially outward for sealing. The seal element can include a sealing surface that faces radially-inward. The two surfaces cooperate to seal a leakage path between rotating components and static components. A small radial gap can be maintained between the sealing element and the seal runner under some operating conditions to allow for an insignificant amount of leakage across the seal and prevent damage to the seal element. Circumferential seal arrangements can be "buffered" in that a flow of pressurized fluid can be directed into the seal housing to positively separate the fluids on opposite axial sides of the seal element. The fluid entering the seal housing is at a higher pressure than the fluids on opposite axial sides of the seal element.

SUMMARY OF THE INVENTION

In summary, the invention is a circumferential sealing arrangement. The circumferential sealing arrangement includes a seal runner operable to be fixed to a structure for concurrent rotation with the structure about an axis. The circumferential sealing arrangement also includes a housing that encircles the seal runner or is encircled by the seal runner. The circumferential sealing arrangement also includes a primary seal element at least partially disposed in the housing. The primary seal element includes a first surface cooperating with a second surface of the seal runner to form a circumferential seal between the primary seal element and the seal runner. The circumferential sealing arrangement also includes a secondary seal element positioned between the housing and the primary seal element on a first side of the primary seal element along the axis of rotation. A second side of the primary seal element along the axis of rotation opposite the first side seals against the housing. The secondary seal element generates a biasing force along the axis of rotation urging the second side against the housing.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The invention, as exemplified in the embodiment described below, can be applied to simplify circumferential seal arrangements, including buffered circumferential seal arrangements. In the exemplary embodiment, two seal elements can be replaced with a single primary seal element. Also, wear that might occur at the sealing interfaces between the seal element and the seal housing is reduced or eliminated entirely.

Figure 1:
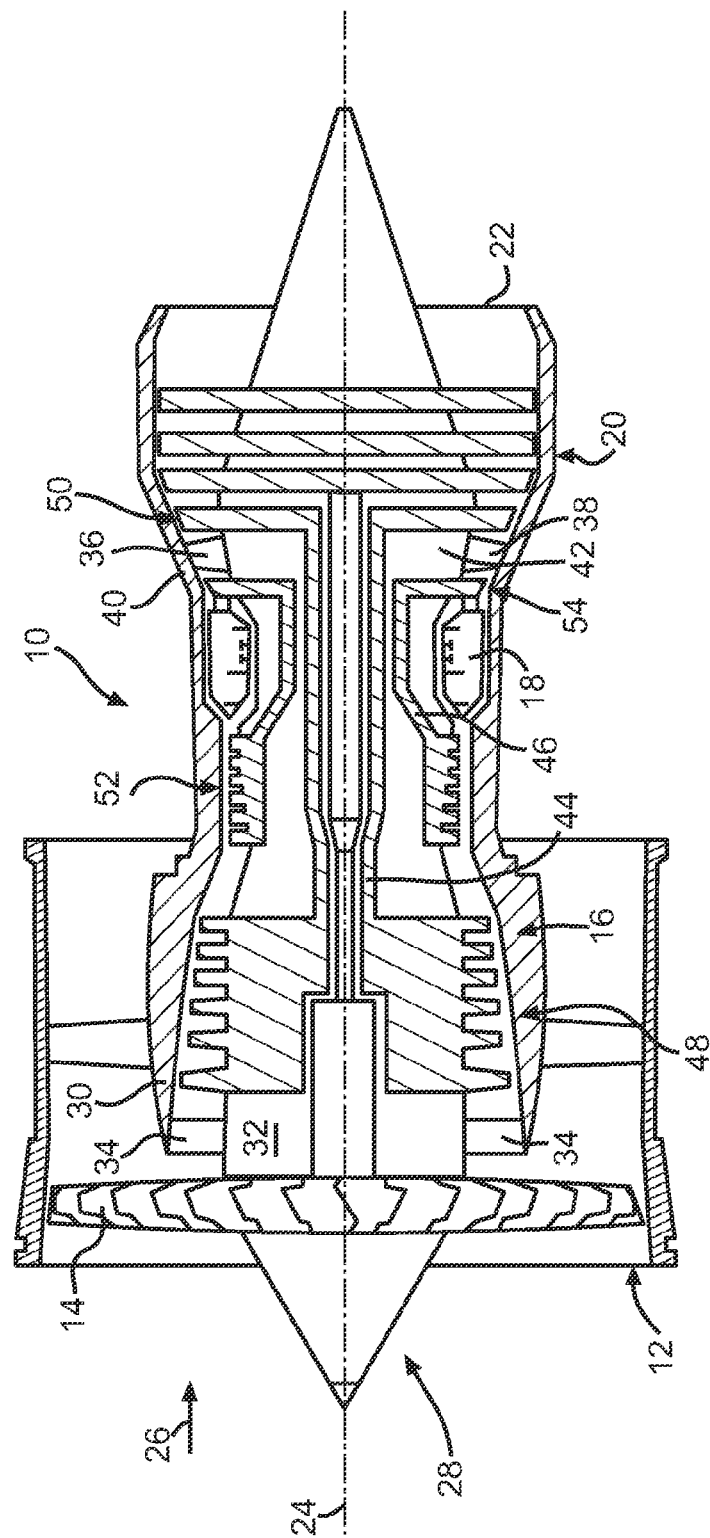
FIG. 1 is a schematic representation of a turbine engine incorporating an exemplary embodiment of the invention.

Referring to FIG. 1, a turbine engine 10 can include an inlet 12 and a fan 14. The exemplary fan 14 can be a bladed disk assembly having a disk or hub defining a plurality of slots and a plurality of fan blades, each fan blade received in one of the slots. In alternative embodiments of the invention, the fan can be a blisk wherein the hub and blades are integrally formed and unitary. The turbine engine can also include a compressor section 16, a combustor section 18, and a turbine section 20. The turbine engine 10 can also include an exhaust section 22. The fan 14, compressor section 16, and turbine section 20 include components arranged to rotate about a centerline axis 24. Fluid such as air can be drawn into the turbine engine 10 as indicated by the arrow referenced at 26. The fan 14 directs fluid to the compressor section 16 where it is compressed. A portion of the fluid can be diverted radially outside of the compressor section 16 and thereby become bypass flow. The compressed fluid emerging from the compressor section 16 is mixed with fuel and ignited in the combustor section 18. Combustion gases exit the combustor section 18 and flow through the turbine section 20. Energy is extracted from the combustion gases in the turbine section 20.

A nose cone assembly 28 can be attached to the fan 14. A turbine case 30 can encircle the core engine components (the compressor, combustor and turbine sections 16, 18, 20). The turbine case 30 can be fixed to a non-rotating hub 32 through a plurality of struts 34. Downstream of the combustor section 18, a row of turbine vanes, such as vanes 36, 38 can be positioned to direct the flow of combustion gases to the turbine section 20. The vanes 36, 38 can extend radially relative to the centerline axis 24, between an outer case 40 and an inner case 42. The outer case 40 can be integral with or separately formed from the case 30.

Shafts 44, 46 are shown disposed for rotation about the centerline axis 24 of the turbine engine 10. Alternative embodiments of the invention can include any number of shafts. The shafts 44, 46 can be journaled together for relative rotation. The shaft 44 can be a low pressure shaft supporting compressor blades 48 of a low pressure portion of the compressor section 16. The shaft 44 can also support low pressure turbine blades 50 of a low pressure portion of the turbine section 20. The shaft 46 encircles the shaft 44. Bearings can be disposed between the shafts 44, 46. The shaft 46 can be a high pressure shaft supporting compressor blades 52 of a high pressure portion of the compressor section 16. The shaft 46 can also support high pressure turbine blades 54 of a high pressure portion of the turbine section 20.

Figure 2:
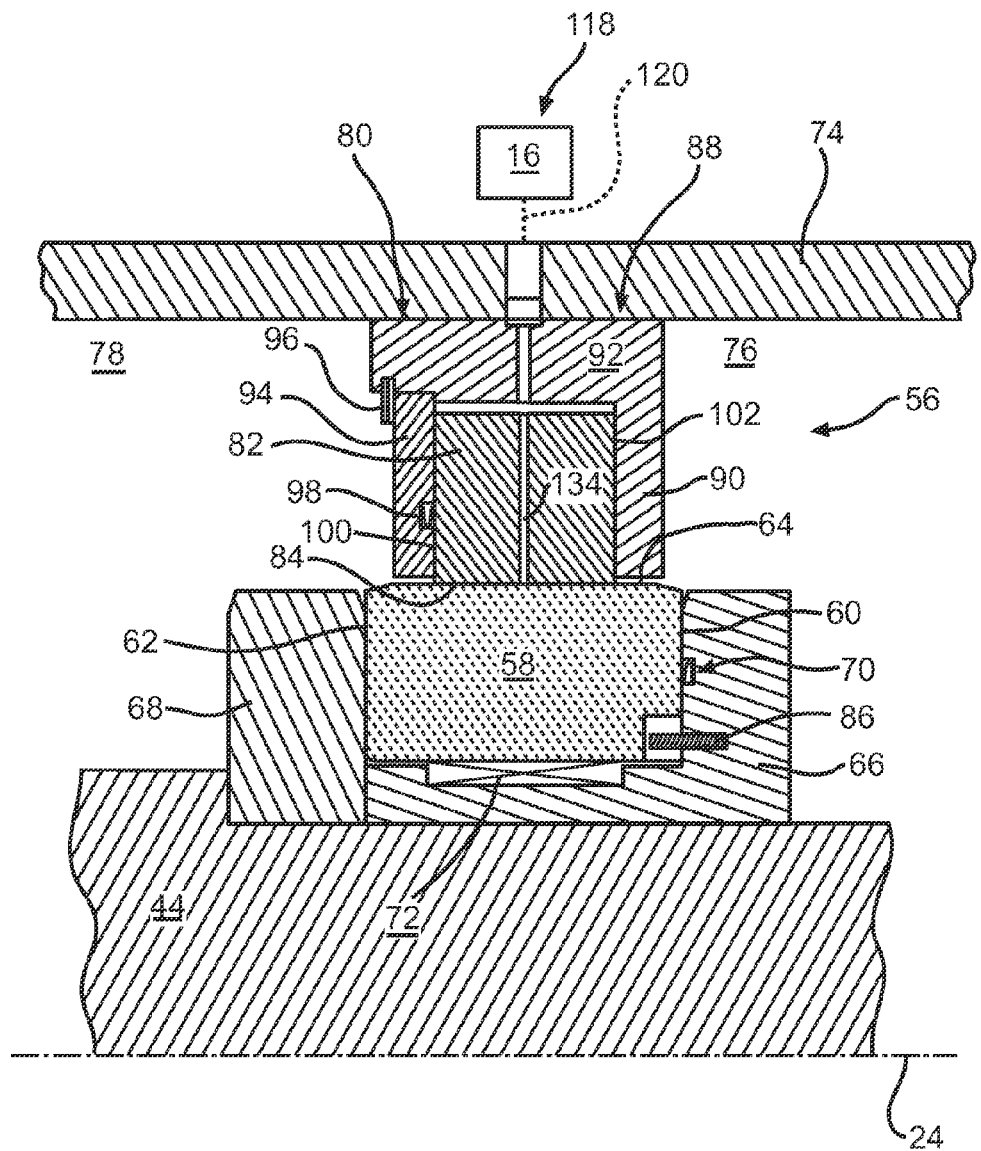
FIG. 2 is a detailed view showing a cross-section of a portion of the structures shown schematically in FIG. 1.

Referring now to FIG. 2, a circumferential sealing arrangement 56 can be applied in the turbine engine 10 (referenced in FIG. 1), such as on the shaft 44. It is noted that the exemplary circumferential sealing arrangement 56 can be applied around structures within the turbine engine 10 other than the shaft 44 and in operating environments other than turbine engines. It is also noted that other embodiments of the invention can be applied around various rotating structures within turbine engines and in operating environments other than turbine engines.

The exemplary circumferential sealing arrangement 56 includes a seal runner 58 operable to be fixed to a structure for concurrent rotation with the structure about an axis. The exemplary seal runner 58 can be fixed to the shaft 44 and rotate with the shaft 44 about the axis 24 during operation of the turbine engine 10. The seal runner 58 extends along the axis 24 between first and second ends 60, 62 and includes a radially outer surface 64.

The seal runner 58 can be mounted on the shaft 44 through a pair of mounting shoulders 66, 68. Each shoulder 66, 68 can be fixed to the shaft 44. A drive pin 86 can couple the seal runner 58 and shoulder 66 to ensure concurrent rotation of the seal runner 58 and shaft 44. A seal, such as face seal or V-seal 70, can be positioned along the axis 24 between the seal runner 58 and the shoulder 66. A second seal (not shown) can be disposed between the seal runner 58 and the shoulder 68 along the axis 24. The seals on opposite sides of the seal runner 58 can be compliant along the axis 24, being operable to deform in response to the relative changes in the length between the seal runner 58 and the other rotating structures. For example, if the seal runner 58 is clamped initially at cold build to some predetermined axial clamp load, at operating temperature the clamp load can diminish due to the relative thermal expansion. The axially compliant member, i.e. face seal 70, accommodates this expansion and maintains a seal. Also, the seals on opposite sides of the seal runner 58 can reduce radial friction if the seal runner 58 and the shoulders 66, 68 change size radially relative to one another and thereby move radially relative to one another. A corrugated tolerance ring (shown schematically at 72) can be positioned in the radial gap between the seal runner 58 and the other rotating structures to accommodate relative changes in radial size. U.S. application Ser. No. 11/946,930, filed Nov. 29, 2007 is hereby incorporated by reference for additional disclosure applicable to embodiments of seal runners that can be incorporated in embodiments of the present invention.

The exemplary seal runner 58 can be ceramic such as silicon nitride, or formed from other materials in alternative embodiments of the invention. Metal may be used to form the seal runner 58. However, structural properties of the metal seal runners can degrade with increasing temperature. Due to the exposure to air at elevated temperatures and the seal heat generation, it can be necessary to provide cooling oil to the seal runner to remove heat. One characteristic of ceramic materials is that they tend to retain their structural properties at very high temperatures. This can make it unnecessary to cool the exemplary seal runner 58, thus removing that quantity of oil from the sump. This is also desirable as it reduces the size of the lubrication system. Also, it has been found that carbon seal elements can be abrasive. As a result, metal seal runners are often coated with a wear-resistant material. Ceramic materials, on the other hand, are relatively hard and a separate coating is not often required. Another desirable characteristic of most ceramic materials is their low coefficient of thermal expansion. However, it is recognized that in some operating environments metal may be a more desirable choice of material for the seal runner and the invention contemplates such embodiments.

The circumferential sealing arrangement 56 also includes a notionally static housing 80 encircling the seal runner 58 and a primary seal element 82 at least partially disposed in the housing 80. A seal housing in an alternative embodiment could have been attached to a coaxial shaft to form an inter-shaft seal. In this case both sealing elements could be either co-, or counter-rotating. The seal runner 58, the primary seal element 82, and the housing 80 cooperate to define a seal between a rotating portion of the turbine engine 10 (in this embodiment the shaft 44) and a static portion of the turbine engine 10, such as casing referenced schematically at 74. The circumferential sealing arrangement 56 can thus divide an interior portion of the turbine engine 10 into first and second chambers 76, 78. One of the chambers 76, 78 can contain structures receiving lubricant, such as gears or bearings.

The primary seal element 82 includes a radially-inward surface 84 cooperating with the radially-outward surface 64 of the seal runner 58 to form a circumferential seal between the primary seal element 82 and the seal runner 58. In alternative embodiments, there is no reason the configuration couldn't be turned inside-out with the ID of the seal runner cooperating with the OD of the sealing element located inside the seal runner. Like the seal runner 58, the primary seal element 82 can be shaped sleeve-like and the diameter of the inner surface 84 can be slightly larger than the diameter of the surface 64. For example, the diameter of the inner surface 84 can be on the order of 0.001 inch larger than the diameter of the surface 64. If both the seal runner 58 and primary seal element 82 are formed from materials having a relatively low thermal coefficient of expansion, the clearance between the two components will be closely maintained throughout the intended operating ranges of the circumferential sealing arrangement, minimizing leakage along the axis.

The exemplary housing 80 can include a first portion 88 having an L shape in cross-section around the axis 24, with a flange portion 90 extending toward the axis 24 from a ring portion 92. The exemplary housing 80 can also include a separable back-plate 94. It can be desirable to form a leak-tight joint between the ring portion 92 and the back-plate 94, such as with a press fit. During assembly of the circumferential sealing arrangement 56, the back-plate 94 can be installed after the primary seal element 82 is installed in the first portion 88. The back-plate 94 can be held in place along the axis 24 with one or more retaining rings 96.

The primary seal element 82 includes a radially-inward surface 84 cooperating with the radially-outward surface 64 of the seal runner 58 to form a circumferential seal between the primary seal element 82 and the seal runner 58. In alternative embodiments, there is no reason the configuration couldn't be turned inside-out with the inner diameter of the seal runner cooperating with the outer diameter of the sealing element located inside the seal runner. Like the seal runner 58, the primary seal element 82 can be shaped sleeve-like and the diameter of the inner surface 84 can be slightly larger than the diameter of the surface 64. For example, the diameter of the inner surface 84 can be on the order of 0.001 inch larger than the diameter of the surface 64. If both the seal runner 58 and primary seal element 82 are formed from materials having a relatively low thermal coefficient of expansion, the clearance between the two components will be closely maintained throughout the intended operating ranges of the circumferential sealing arrangement, minimizing leakage along the axis.

The circumferential sealing arrangement 56 also includes a secondary seal element 98 positioned between the housing 80 and the primary seal element 82. The secondary seal element 98 is positioned on a first side 100 of the primary seal element 82 along the axis 24. The exemplary secondary seal element 98 can be a single, metal V-seal. In alternative embodiments of the invention, the secondary seal element 98 can include a plurality of discrete sealing elements spaced radially from one another and/or can take a form other than a metal V-seal. The primary seal element 82 and the housing 80 can cooperate to form seal on the first side 100.

A second side 102 of the primary seal element 82 along the axis 24 opposite the first side 100 seals against the housing 80. The second side 102 and the flange portion 90 of the housing 80 contact one another. At the completion of assembly of the circumferential sealing arrangement 56 and prior to rotation of the shaft 44 (operation of the turbine engine 10), a non-zero first sum of force biases the primary seal element 82 in the direction of the flange portion 90 along the axis 24. In the exemplary embodiment, the secondary seal element 98 generates a biasing force along the axis 24 urging the second side 102 against the housing 80.

In the exemplary embodiment of the invention, the operating conditions of the turbine engine 10 can be applied to change the sum of force or net force acting to bias the second side 102 against the housing 80. For example, a plurality of fluids can be applied against the primary seal element 82 during rotation of the shaft 44 such that the sum of force acting on the primary seal element 82 along the axis 24 diminishes after the assembling step.

As set forth above, the circumferential sealing arrangement 56 can bifurcate an interior portion of the turbine engine 10 into first and second chambers 76, 78. Fluid, such air or any other fluid, in each chamber can be at the same or different pressures. The fluids in the respective chambers 76, 78 can act opposite sides 100, 102 of the primary seal element 82. The cross-sectional areas of the opposite sides 100, 102 that are exposed/bared to the fluids in the respective chambers 76, 78 can be selected in view of their respective pressures such that the sum of forces acting on the primary seal element 82 decreases. It is noted that in the exemplary embodiment it can be desirable to have a non-zero sum of forces acting on the primary seal element 82 along the axis 24 from the first side 100 toward the second side 102 during operation so that the seal between the primary seal element 82 and the housing 80 is maintained. However, the sum of forces during operation can be less than the sum of forces after assembly and prior to operation.

In addition, fluid can be applied against the primary seal element 82 within the housing 80 to change the sum of forces acting to bias the second side 102 against the housing 80. Reducing the sum of forces acting to bias the second side 102 against the housing 80 can be desirable to reduce wear of the primary seal element 82 and also to reduce the generation of heat. These benefits in turn yield further benefits of reducing or eliminating the need for a dedicated cooling system for the circumferential sealing arrangement 56.

It is noted that the benefits identified above are applicable to the exemplary embodiment of the broader invention that is set forth in the claims. Alternative embodiments of the invention can be practiced to yield similar benefits in different operating environments. However, it is noted that any benefits set forth herein may not be realized in all operating environments for all embodiments of the invention. Furthermore, it is noted that the benefits articulated herein are not exhaustive. Other benefits may be perceived in the practice of the exemplary embodiment or in the practice of alternative embodiments of the invention. The benefits associated with the exemplary embodiment and described herein are not limitations of the broader invention, but rather demonstrate the industrial applicability of the invention enjoyed through the exemplary embodiment.

Figure 3:
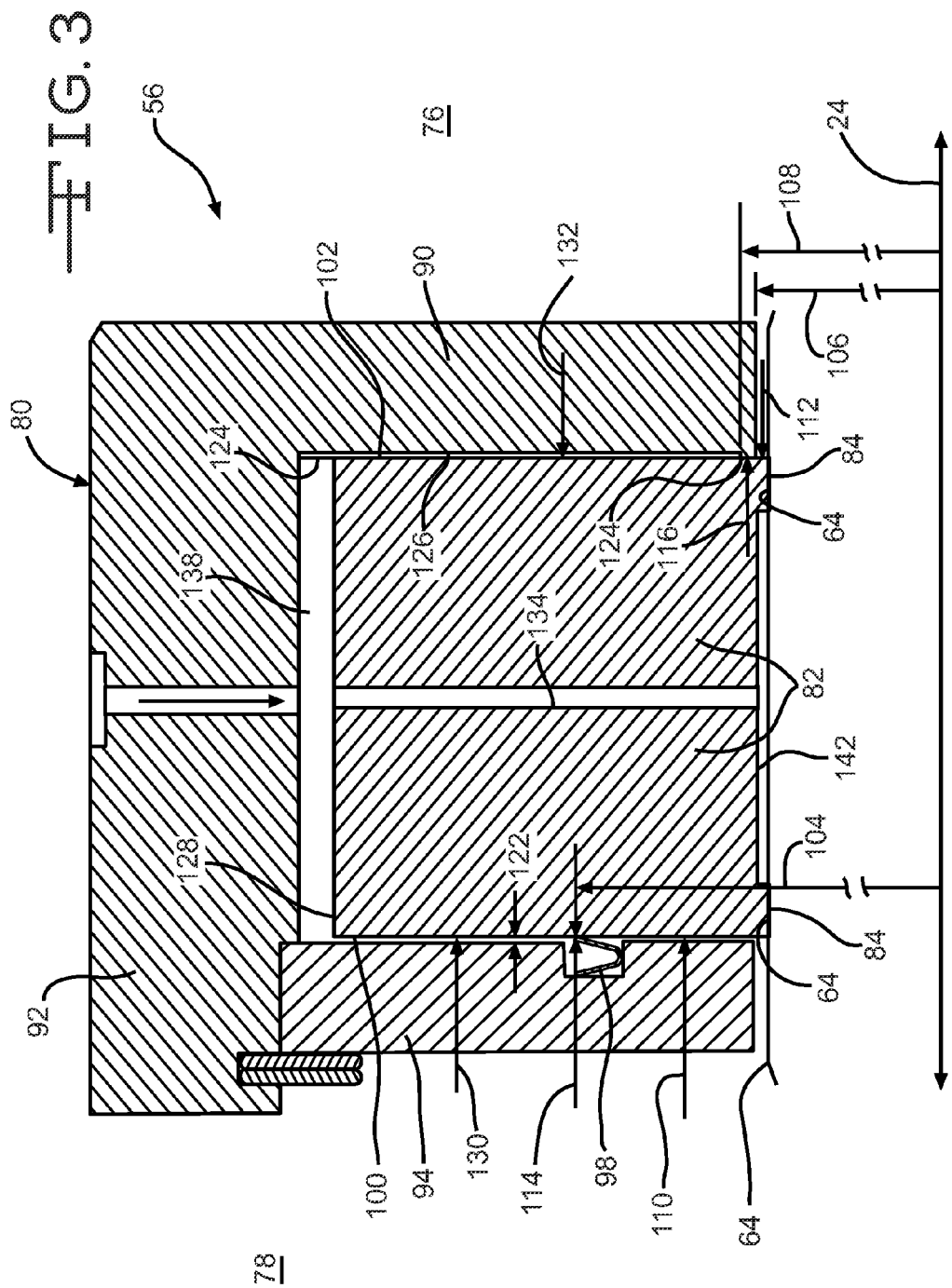
FIG. 3 is a magnified view of a portion of FIG. 2.

Different cross-sectional areas on the opposite axial sides 100, 102 of the primary seal element 82 can be exposed or bared to the fluids in the chambers 76, 78 by sealing at locations that are radially spaced from one another relative to the axis 24. Referring now to FIG. 3, the radially-innermost edge of contact between the primary seal element 82 and the secondary seal element 98 on the first side 100 can be a first distance from the axis 24, referenced by arrow 104. In the exemplary embodiment, the area of contact between secondary seal element 98 and the first side 100 can be a narrow band, theoretically a single point of contact in the cross-sectional plane containing the axis 24.

The radially-innermost edge of contact between the primary seal element 82 and the housing 80 on the second side 102 can be a second distance from the axis 24, referenced by arrow 106. The second distance 106 can be different than the first distance 104. The radially-outermost edge of contact between the primary seal element 82 and the housing 80 on the second side 102 can be a third distance from the axis 24, referenced by arrow 108. The radially-innermost edge of contact between the primary seal element 82 and the secondary seal element 98 on the first side 100 can be radially spaced from a radially-outermost edge of contact between the primary seal element 82 and the housing 80 on the second side 102. In other words, the area of contact between the secondary seal element 98 and the primary seal element 82 can be radially spaced from the area of contact between the primary seal element 82 and the housing 80. In alternative embodiments, the respective areas of contact can partially overlap.

The cross-sectional area of the primary seal element 82 exposed to fluid in the chamber 78 is (Π•(Radius of the radially-innermost edge of contact between the primary seal element 82 and the secondary seal element 98 on the first side 100)$^2$)−(Π•(Radius of the surface 84)$^2$). The cross-sectional area of the primary seal element 82 exposed to fluid in the chamber 78 is (Π•(Radius of the radially-innermost edge of contact between the primary seal element 82 and the housing 80 on the second side 102)$^2$)−(Π•(Radius of the surface 84)$^2$). The cross-sectional area of the primary seal element 82 exposed to fluid in the chamber 78 is thus different than the cross-sectional area of the primary seal element 82 exposed to fluid in the chamber 76.

The radial distances represented by arrows 104 and 106 can be selected in view of the pressures of the fluids in the chambers 76, 78 and in view of the biasing force generated by the secondary seal element 98. The pressures of the fluids in the chambers 76, 78 can be the same or can be different. The arrow referenced at 110 represents a force acting on the primary seal element 82 directed along the axis 24 from the first side 100 toward the second side 102. The level of force 110 corresponds to the fluid pressure in the chamber 78 multiplied by the cross-sectional area of the primary seal element 82 exposed to fluid in the chamber 78.

The arrow referenced at 112 represents a force acting on the primary seal element 82 directed along the axis 24 from the second side 102 toward the first side 100. The level of force 112 corresponds to the fluid pressure in the chamber 76 multiplied by the cross-sectional area of the primary seal element 82 exposed to fluid in the chamber 76. The arrow referenced at 114 represents another force acting on the primary seal element 82 directed along the axis 24 from the first side 100 toward the second side 102. The level of force 114 is the biasing force exerted on the exemplary primary seal element 82 by the exemplary secondary seal element 98. The arrow referenced at 116 represents the sum of forces acting on the primary seal element 82 directed along the axis 24 from the first side 100 toward the second side 102. The level of force 116, as thus far described, would be: (force 110)+(force 114)−(force 112).

The level of force 116 can be diminished after assembly of the circumferential sealing arrangement 56, during operation, by the selection of the radial distances represented by arrows 104 and 106 in view of the pressures of the fluids in the chambers 76, 78 and in view of the biasing force generated by the secondary seal element 98. For example, if the pressure in the chamber 76 is much greater than the pressure in the chamber 78, the distance 106 can be much smaller than the distance 104 to minimize the cross-sectional area of the primary seal element 82 exposed to fluid in the chamber 76. Alternatively, if the pressure in the chamber 76 was substantially similar to the pressure in the chamber 78, the distance 104 can be smaller than the distance 106 so that more fluid pressure is applied to the second side 102 to offset the axial load applied on the primary seal element 82 by the secondary seal element 98.

As set forth above, fluid can also be applied against the primary seal element 82 within the housing 80 during operation of the turbine engine to change the sum of forces acting to bias the second side 102 against the housing 80. Referring again to FIG. 2, the exemplary embodiment can include a pressurized fluid system 118 having a source of pressurized fluid and a conduit communicating pressurized fluid from the source to an interior of the housing 80. The exemplary system 118 is shown schematically to include the compressor section 16 of the turbine engine and a conduit 120. Bleeding air from the compressor section 16 of a turbine engine is well known. It is noted that alternative embodiments of the invention can be practiced in which different sources of pressurized fluid can be applied.

The pressurized fluid directed into the housing 80 from the system 118 can be applied against the primary seal element 82 by spacing the housing 80 and the primary seal element 82 from one another on one or both of the opposite axial sides 100, 102. Further, the cross-sectional area(s) exposed to the pressurized fluid can be selected or sized in view of the other forces acting on the primary seal element 82. These forces can include forces arising from fluid pressures in the chambers 76, 78 and/or from the secondary seal element 98.

Referring again to FIG. 3, in the exemplary embodiment, gaps are defined between the primary seal element 82 and the housing 80 on both of the first and second sides 100, 102. These gaps or open spaces allow pressurized fluid to act on both of the first and second sides 100, 102. On the first side 100, the secondary seal element 98 urges the primary seal element 82 away from the back-plate 94 and a space referenced at 122 is formed.

On the second side 102, the housing 80 includes a surface 124 opposing and contacting the second side 102. The housing 80 also includes a plurality of grooves 126 recessed from the surface 124 along the axis 24. The plurality of grooves 126 can be positioned radially outward of a radially-outermost edge of contact between the primary seal element 82 and the housing 80 on the second side 102.

As shown in FIG. 3, the empty space between the housing 80 and the primary seal element 82 on the second side 102 can be radially larger than the radial distance of sealing contact between the housing 80 and the primary seal element 82. This radially-outermost edge of contact is referenced by the arrow 108. The plurality of grooves 126 can be evenly spaced about the axis 24 or can be positioned differently about the axis 24. The plurality of grooves 126 can extend perpendicular to the axis 24 or be oriented differently relative to the axis 24. The plurality of grooves 126 can have any desired cross-section. It is noted that in alternative embodiments of the invention the second side 102 can have grooves, indentations, or any other form of discontinuities in the surface defining the second side 102 to create open space between the primary seal element 82 and the housing 80.

The cross-sectional area of the exemplary first side 100 that is exposed to the pressurized fluid in the housing 80 is ($\Pi \cdot$(Radius of a radially outer edge 128 of the primary seal element 82)$^2$)−($\Pi \cdot$(Radius of the radially-innermost edge of contact between the primary seal element 82 and the secondary seal element 98 on the first side 100)$^2$). The geometry of the plurality of grooves 126 defines the cross-sectional area of the second side 102 that is exposed to the pressurized fluid in the housing 80. For example, a quantity of cross-sectional area of the second side 102 is exposed in each groove 126. The sum of all the quantities of cross-sectional area of the second side 102 exposed in all the grooves 126 is the area exposed to the pressurized fluid.

The respective sizes of the area exposed to pressurized fluid on the first side 100 and the second side 102 within the housing 80 can be different. In the exemplary embodiment, the sizes can be selected in view of the pressures of the fluids in the chambers 76, 78 and in view of the biasing force generated by the secondary seal element 98. In addition or alternatively, the respective sizes of the area exposed to pressurized fluid on the first side 100 and the second side 102 within the housing 80 can be selected in view of the selection of the radial distances represented by arrows 104 and 106. In other words, the values/dimensions of several features can be selected in view of one another: the sealing diameters (the radial distances represented by arrows 104 and 106), the respective sizes of the area exposed to pressurized fluid on the first side 100 and the second side 102 within the housing 80, the respective sizes of the area exposed to the fluids within the chambers 76 and 78, and the pressure of the pressurized fluid directed into the housing 80. Further, these values/dimensions can be selected in view of the pressures of the fluids within the chambers 76 and 78. The selection of these values/dimensions can made with the goal of partially offsetting or decreasing the sum of forces urging the primary seal element 82 against the housing 80.

As set forth above, the arrow referenced at 110 represents the force acting on the primary seal element 82 directed along the axis 24 from the first side 100 toward the second side 102 and corresponds to the fluid pressure in the chamber 78 multiplied by the cross-sectional area of the primary seal element 82 exposed to fluid in the chamber 78. The arrow referenced at 112 represents the force acting on the primary seal element 82 directed along the axis 24 from the second side 102 toward the first side 100 and corresponds to the fluid pressure in the chamber 76 multiplied by the cross-sectional area of the primary seal element 82 exposed to fluid in the chamber 76. The arrow referenced at 114 represents the force acting on the primary seal element 82 directed along the axis 24 from the first side 100 toward the second side 102 and is the biasing force exerted on the exemplary primary seal element 82 by the exemplary secondary seal element 98. The arrow referenced at 116 represents the sum of forces acting on the primary seal element 82 directed along the axis 24 from the first side 100 toward the second side 102. An arrow 130 represents the force acting on the primary seal element 82 directed along the axis 24 from the first side 100 toward the second side 102 and corresponds to the fluid pressure in the housing 80 multiplied by the cross-sectional area of the primary seal element 82 on the first side 100 exposed to fluid in the housing 80. An arrow 132 represents the force acting on the primary seal element 82 directed along the axis 24 from the second side 102 toward the first side 100 and corresponds to the fluid pressure in the housing 80 multiplied by the cross-sectional area of the primary seal element 82 on the second side 102 exposed to fluid in the housing 80.

After assembly and prior to operation, the level of force 116 would be equal to the force 114. During operation, the level of force 116 in the exemplary embodiment would be: (force 110)+(force 114)−(force 112)+(force 130)−(force 132). The level of force 116 can diminish after assembly of the circumferential sealing arrangement 56 as the respective levels of the forces 110, 112, 130, and 132 increase during operation. It is noted that the exemplary embodiment thus provides numerous design criteria that can be selected in view of operating conditions to minimize the sum of force represented by arrow 116, such as the selection of the sealing diameters and the amount of area exposed to pressurized fluid within the housing 80. The level of pressure of the pressurized fluid directed into the housing 80 can also be selected. This fluid can be at a higher pressure than the pressure of the fluid in the chambers 76, 78.

Figure 4:
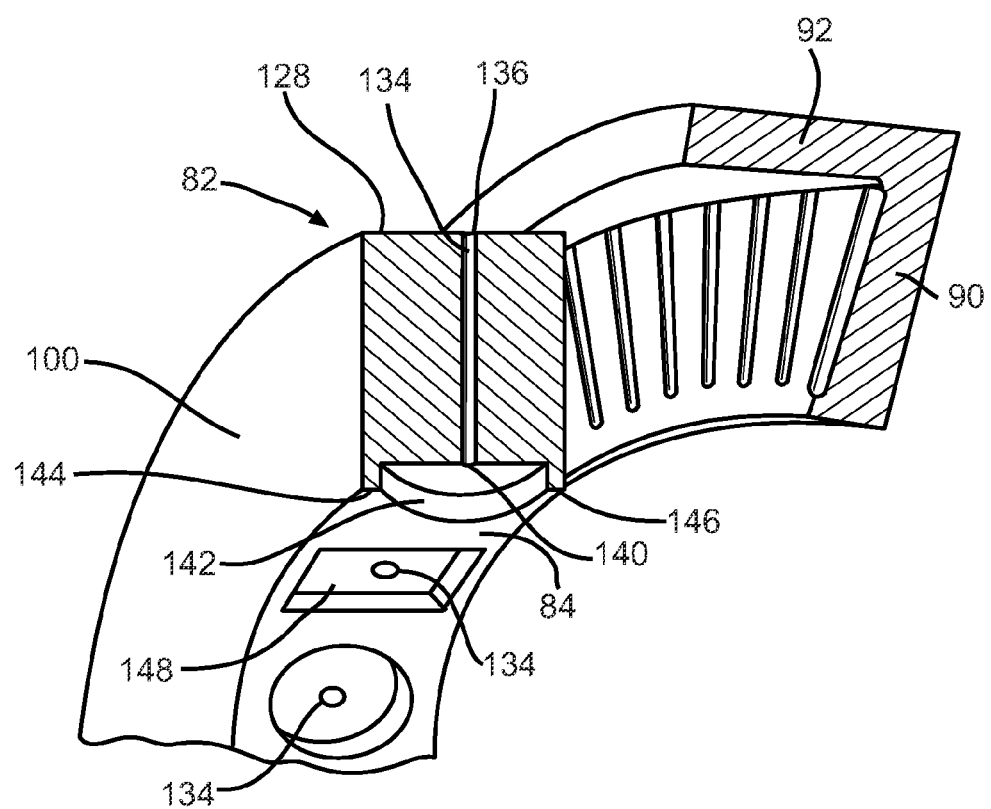
FIG. 4 is a perspective partial-view of a primary seal element and housing according to an embodiment of the invention.

The pressurized fluid directed into the housing 80 can also be applied to maintain the primary seal element 82 centered on the seal runner 58. Referring now to FIG. 4, apertures 134 can extend radially inward through the primary seal element 82 from the outer surface 128 to the inner surface 84. The primary seal element 82 can include a plurality of apertures similar to aperture 134. The aperture 134 can extend from a first opening 136 communicating with open space between the housing 80 and the primary seal element 82 (referenced in FIG. 3 at 138) and a second opening 140. The second opening 140 opens into a pocket 142. The pocket 142 can be recessed radially-outward from the radially-inward surface 84 and define a volume. The aperture 134 and pocket 142 cooperate to allow pressurized fluid to fill the gap between the primary seal element 82 and the seal runner 58 (referenced in FIG. 3) and create a hydrostatic force which tends to keep the primary seal element 82 centered on the seal runner 58. If the shaft 44 (referenced in FIG. 2) should whirl or orbit during operation, the primary seal element 82 will float radially within the housing 80, with the clearance gap between the primary seal element 82 and the seal runner 58 centered on the seal runner 58. Non-contacting operation reduces or eliminates wear.

The size of the apertures 134 that feed the pockets 142 can be sized appropriately. Technically, the apertures and the pockets 142 and air film space between the runner 58 and the sealing element 82 can be designed to form either an orifice compensated hydrostatic bearing or a film compensated bearing. An orifice compensation arrangement may be best in many operating environments, but might not be appropriate for all potential embodiments.

It is noted that the friction force resulting from the contact between the secondary seal and the sealing element, and between the sealing element and the seal housing can be desirable to stabilize the seal ring. Since the shaft can whirl the sealing element will be required to track this motion. Some sort of damping force is required to stabilize the orbit of the seal element otherwise it can go into a hula-hoop type motion about the orbiting shaft. This can result in unintended contact or ultimately destruction of the seal element if some means of damping is not provided.

The pocket 142 can be positioned between portions of the radially-inward surface 84 along the axis 24, such as referenced at 144 and 146. The pocket 142 can be centered between portions 144 and 146. The primary seal element 82 can include a plurality of pockets that can be similarly shaped or differently shaped. FIG. 4 shows the exemplary pocket 142 to be circular and an adjacent pocket 148 to be rectangular/square. The pockets can be evenly spaced about the axis 24. It is noted that the arrangement of apertures 134 and pockets is incorporated in the exemplary embodiment of the present invention and is itself viewed as a distinct invention.

In embodiments of the invention other than the one described herein the seal assembly need not be stationary as the sealing element and all of the individual pieces that comprise the seal assembly have hoop integrity and will not therefore be substantially deformed as a result of being rotated. In fact the seal housing could be static, rotate in the same direction as the seal runner, or rotate in a direction opposite to the seal runner.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A circumferential sealing arrangement comprising: a seal runner operable to be fixed to a structure for concurrent rotation with the structure about an axis; a housing being one of encircling and encircled by said seal runner; a primary seal element at least partially disposed in said housing and having a first surface cooperating with a second surface of said seal runner to form a circumferential seal between said primary seal element and said seal runner; and a secondary seal element positioned between said housing and said primary seal element on a first side of said primary seal element along said axis of rotation, wherein a second side of said primary seal element along said axis of rotation opposite said first side seals against said housing and said secondary seal element generates a biasing force along said axis of rotation urging said second side against said housing, wherein said housing and said primary seal element are at least partially spaced from one another along said axis of rotation on both of said first and second sides.

2. The circumferential sealing arrangement of claim 1 wherein said secondary seal element comprises a single seal.

3. The circumferential sealing arrangement of claim 1 wherein said primary seal element is further defined as being a unitary structure along said axis of rotation between said secondary seal element and said housing at a plurality of positions about said axis of rotation.

4. The circumferential sealing arrangement of claim 1 wherein a radially-innermost edge of contact between said primary seal element and said secondary seal element on said first side is a first distance from said axis of rotation and a radially-innermost edge of contact between said primary seal element and said housing on said second side is a second distance from said axis of rotation different than said first distance.

5. The circumferential sealing arrangement of claim 1 wherein said housing includes a surface opposing and contacting said second side and also includes a plurality of grooves recessed along said axis of rotation from said surface, said plurality of grooves being positioned radially outward of a radially-outermost edge of contact between said primary seal element and said housing on said second side.

6. The circumferential sealing arrangement of claim 1 wherein said primary seal element further comprises: at least one pocket recessed from said first surface and defining a volume; and at least one aperture extending from a first opening communicating with an open space between said housing and said primary seal element and a second opening communicating with said at least one pocket.

7. The circumferential sealing arrangement of claim 6 wherein said at least one pocket is positioned between portions of said first surface along said axis of rotation.

8. The circumferential sealing arrangement of claim 7 wherein: said at least one pocket is further defined as a plurality of discrete pockets substantially evenly spaced about said axis of rotation; and said at least one aperture is further defined as a plurality of apertures each extending between the open space between said housing and said primary seal element and one of said plurality of pockets.

9. A method of arranging a circumferential seal comprising the steps of: fixing a seal runner on a structure for concurrent rotation about an axis; sealing against a radially-outer surface of the seal runner with a primary seal element at least partially disposed in a housing, wherein the primary seal element is radially moveable relative to the housing; and assembling the housing and the primary seal element and the seal runner with a secondary seal element disposed between the primary seal element and the housing such that, prior to rotation, a non-zero sum of force biases the primary seal element in one direction along the axis of rotation.

10. The method of claim 9 further comprising the step of: applying a plurality of fluids at different pressures during rotation of the structure such that the sum of force diminishes after said assembling step.

11. The method of claim 10 wherein said applying step includes the step of: exposing a first cross-sectional area of the primary seal element on a first side of the primary seal element along the axis of rotation to a first fluid at a first pressure; and baring a second cross-sectional area of the primary seal element on a second side of the primary seal element opposite the first side along the axis of rotation to a second fluid at a second pressure different than the first pressure, wherein the second cross-sectional area is different than the first cross-sectional area.

12. The method of claim 10 said applying step is further defined as: applying a plurality of fluids at different pressures during rotation of the structure such that the sum of force drops to substantially zero after said assembling step.

13. The method of claim 10 wherein said applying step includes the step of: exposing differently-sized cross-sectional areas on opposite axial sides of the primary seal element to pressurized fluid within the housing.

14. The method of claim 10 wherein said assembling step includes the step of: biasing the primary seal element in one direction along the axis of rotation with the secondary seal element.

15. The method of claim 10 wherein said assembling step includes the step of: sealing against opposite axial sides of the primary seal element at locations that are radially spaced from one another relative to the axis of rotation.

16. The method of claim 10 wherein said assembling step includes the steps of: sealing the primary seal element and the housing relative to one another on a first side of the primary seal element along the axis of rotation with the secondary seal element; and sealing the primary seal element and the housing directly against one another on a second side of the primary seal element along the axis of rotation opposite the first side.

17. The method of claim 16 wherein said assembling step includes the steps of: spacing the housing and the primary seal element from one another along at least part of the second side of the primary seal element; and sizing an empty space between the housing and the primary seal element on the second side to be radially larger than a radial distance of sealing contact between the housing and the primary seal element.

18. A turbine engine comprising: a shaft operable to rotate about an axis of rotation; a seal runner fixed to said shaft for concurrent rotation about said axis of rotation; a housing encircling said seal runner; a primary seal element at least partially disposed in said housing and having a radially-inward surface cooperating with a radially-outward surface of said seal runner to form a circumferential seal between said primary seal element and said seal runner and separating a first fluid positioned on a first side of said primary seal element along said axis of rotation from a second fluid positioned on a second side of said primary seal element opposite said first side along said axis of rotation; a secondary seal element positioned between said housing and said primary seal element on said first side of said primary seal element, wherein of said primary seal element seals against said housing on said second side and wherein said secondary seal generates a biasing force along said axis of rotation urging said second side against said housing; and a pressurized fluid system including a source of pressurized fluid and a conduit communicating pressurized fluid from said source to an interior of said housing, where gaps are defined between said primary seal element and said housing on both of said first and second sides to allow pressurized fluid to act on both of said first and second sides.

19. The turbine engine of claim 18 wherein a radially-innermost edge of contact between said primary seal element and said secondary seal element on said first side is radially spaced from a radially-outermost edge of contact between said primary seal element and said housing on said second side.

* * * * *